United States Patent
Mann (10) Patent No.: US 8,875,611 B2
(45) Date of Patent: Nov. 4, 2014

(54) PARTING TOOL

(75) Inventor: Rainer Mann, Aalen-Unterrombach (DE)

(73) Assignee: C. & E. Fein GmbH (DE)

( * ) Notice: Subject to any disclaimer, the term of this patent is extended or adjusted under 35 U.S.C. 154(b) by 416 days.

(21) Appl. No.: 13/046,554

(22) Filed: Mar. 11, 2011

(65) Prior Publication Data

US 2011/0219929 A1   Sep. 15, 2011

(30) Foreign Application Priority Data

Mar. 12, 2010   (DE) .......................... 10 2010 012 019

(51) Int. Cl.
| | | |
|---|---|---|
| B26D 5/08 | (2006.01) | |
| B27B 13/02 | (2006.01) | |
| B26B 1/00 | (2006.01) | |
| B26B 9/02 | (2006.01) | |
| B27B 19/00 | (2006.01) | |

(52) U.S. Cl.
CPC ............. *B27B 19/008* (2013.01); *B23B 61/006* (2013.01); *B23B 61/121* (2013.01)
USPC ................... 83/607; 83/835; 83/848; 83/851; 30/339; 30/355

(58) Field of Classification Search
USPC .......... 30/272.1, 277.4, 355, 357, 350, 166.3, 30/501–504, 507, 339, 392–394, 123.3, 30/330, 338; 83/597–606, 835–855, 607, 83/661; 606/171, 176–179, 82
See application file for complete search history.

(56) References Cited

U.S. PATENT DOCUMENTS

| 352,867 | A | * | 11/1886 | Greist ............................ 83/848 |
| 2,141,504 | A | * | 12/1938 | Balfour et al. .................. 83/846 |
| 2,568,870 | A | * | 9/1951 | Ronan ............................ 83/846 |
| 2,853,106 | A | * | 9/1958 | Kanthack ....................... 30/514 |
| 3,690,357 | A | * | 9/1972 | Lugo ............................ 144/232 |
| 3,706,474 | A | * | 12/1972 | Neuenburg .................... 299/38.1 |
| 3,805,383 | A | * | 4/1974 | McNally ......................... 30/92 |

(Continued)

FOREIGN PATENT DOCUMENTS

| AT | 382776 B | 4/1987 |
| CH | 511016 A | 8/1971 |

(Continued)

OTHER PUBLICATIONS

European Search Report; Application No. EP 11 15 1482; Issued: Jun. 22, 2011; 7 pages.

*Primary Examiner* — Ghassem Alie
*Assistant Examiner* — Bharat C Patel
(74) *Attorney, Agent, or Firm* — St. Onge Steward Johnston & Reens LLC (57) ABSTRACT

A tool for parting, in particular for sawing, includes a carrier blade that has a toothing portion with a finite, geometrically determined toothing, and a receiver for fixing the carrier blade to a tool spindle of a power tool. The tool spindle can be driven in oscillation about its longitudinal axis. The toothing is disposed at a distance from the receiver and is configured to be advanced perpendicularly in relation to the longitudinal axis, such that the toothing is realized in a non-uniform manner along the toothing portion. The toothing portion has a middle region and end regions that adjoin the middle region and that are provided with strengthened corner teeth.

15 Claims, 3 Drawing Sheets

(56) References Cited

U.S. PATENT DOCUMENTS

| | | | |
|---|---|---|---|
| 3,905,374 A * | 9/1975 | Winter | 606/178 |
| 4,637,391 A * | 1/1987 | Schlein | 606/172 |
| 4,640,172 A | 2/1987 | Kullmann et al. | |
| 4,768,504 A * | 9/1988 | Ender | 606/177 |
| 5,087,261 A * | 2/1992 | Ryd et al. | 606/82 |
| 5,119,708 A * | 6/1992 | Musgrove | 83/835 |
| 5,468,247 A | 11/1995 | Matthai et al. | |
| 5,603,252 A * | 2/1997 | Hayden, Sr. | 83/851 |
| 5,846,244 A | 12/1998 | Cripe | |
| 6,185,826 B1 * | 2/2001 | Lutz et al. | 30/277.4 |
| 6,656,186 B2 * | 12/2003 | Meckel | 606/82 |
| 7,036,415 B2 * | 5/2006 | Tsujimoto | 83/661 |
| 7,806,033 B2 * | 10/2010 | Kocher et al. | 83/835 |
| 2001/0041524 A1 * | 11/2001 | Steiger et al. | 451/356 |
| 2002/0104421 A1 * | 8/2002 | Wurst | 83/835 |
| 2007/0123893 A1 | 5/2007 | O'Donoghue | |
| 2007/0251372 A1 * | 11/2007 | Petts et al. | 83/846 |
| 2008/0052922 A1 * | 3/2008 | Balint | 30/380 |
| 2008/0121084 A1 * | 5/2008 | Vogel et al. | 83/835 |

FOREIGN PATENT DOCUMENTS

| | | |
|---|---|---|
| DE | 3307170 C2 | 8/1986 |
| DE | 3838844 A1 | 5/1990 |
| DE | 29819959 U1 | 3/2000 |
| DE | 10325392 A1 | 12/2004 |
| EP | 0695607 A1 | 2/1996 |
| EP | 0881023 A2 | 12/1998 |
| EP | 1190800 A2 | 3/2002 |
| GB | 2107641 A | 5/1983 |
| GB | 2345461 A | 7/2000 |

* cited by examiner

PARTING TOOL

CROSSREFERENCES TO RELATED APPLICATIONS

This application claims priority from German patent application 10 2010 012 019.7, filed on Mar. 12, 2010. The entire contents of this priority application is incorporated herein by reference.

BACKGROUND OF THE INVENTION

The invention relates to a parting tool, in particular for sawing, having a carrier blade that has a toothing portion having a finite, geometrically determined toothing, having a receiver for fixing to a tool spindle of a hand tool, which tool spindle can be driven in oscillation about its longitudinal axis, the toothing being disposed at a distance from the receiver and being configured to be advanced perpendicularly in relation to the longitudinal axis.

Such a tool is known from EP 0 881 023 A2.

The tool in that case is a cutting and grinding tool for an oscillation drive, which tool has a cutting edge provided with teeth. The cutting edge is disposed on a plate having a region that directly adjoins the cutting edge and that is configured so as to be narrower than the cutting edge.

Such tools are frequently used in the case of oscillation drives. A great variety of applications can be effected in such cases, particularly in sawing or cutting.

Such tools operated in an oscillatory manner can be used, in particular, to make grooves, through-holes and openings in a material to be worked. Such operations can be effected particularly accurately and almost without cutting waste, since no substantial tool run-out is required. Apart from the advance motion, the parting operation in such cases does not require the operator to effect any further substantial relative motion between the tool and the workpiece to be worked.

It has been found, however, that such parting tools, particularly in the context of the aforementioned applications, have only a limited service life.

In view of this, it is a first object of the invention to disclose a parting tool, in particular a sawing tool, for a rotary oscillation drive, which tool has an increased operating life.

It is a second object of the invention to disclose a tool that provides for a longer service life, before failures due to wear or breakage may occur.

It is a third object of the invention to disclose a tool having an extended cutting performance over time when compared to previous designs.

It is a forth object of the invention to disclose a parting tool allowing for an easier cut in particular in the beginning when used in combination with an oscillatory power tool.

SUMMARY OF THE INVENTION

These and other objects are achieved, in the case of a tool of the type mentioned at the outset, in that the toothing is configured in a non-uniform manner along the toothing portion, the toothing portion being provided with a middle region and having end regions that adjoin the latter and that are provided with strengthened corner teeth, in particular with geometrically strengthened corner teeth.

The object of the invention is thereby achieved.

This is because, according to the invention, the regions that are subjected to high load are strengthened, in order to prevent early failures or increased wear. The strengthening of the corner teeth is, in particular, effected by geometrical measures, i.e. the design of the corner teeth is configured to provide more (geometric) structure that provides increased strength while using the same material. This could be effected by broader or smaller teeth, by flatter flanks etc.

It is precisely in applications in which the entire toothing portion penetrates a workpiece, thus, for instance, when a through-hole is being made in a panel, wall or the like, that the corner teeth, in particular, are subjected to a high load. This is due, inter alia, to the fact that the corner teeth are intended to have adjacent teeth only on one side, towards the middle portion, and consequently are not protected by other teeth on the other side.

In the case of other usual sawing applications, by comparison, sawing tools are either provided with a full-circumference toothing, for instance in the case of circular saws, such that each tooth is relieved of load, or protected, on both sides by adjacent teeth or, on the other hand, for instance in the case of compass saws, special tooth run-outs are provided, such that end teeth are protected to a certain extent by adjoining supporting geometries. It is to be noted, however, that these sawing tools clearly never have their entire toothing in full engagement. For this reason, such measures cannot be effected in the case of tools driven in rotary oscillation, since they would limit the application possibilities.

This peculiarity has been given particular consideration within the scope of the invention. Because of the selective geometric strengthening of the corner teeth, it is now possible to achieve a tool form that enables the individual teeth of the toothing to be loaded uniformly when the toothing portion is fully engaged in a workpiece, in that the load level of the corner teeth is reduced.

Premature breakages of the corner teeth can thereby be prevented in an effective manner. The operating life of the tool can be increased.

According to a development of the invention, the corner teeth have a lesser tooth depth than adjacent teeth of the toothing.

The end regions of the toothing portion can thereby be strengthened in a particularly simple manner, even if tooth crests of teeth of the toothing continue to be configured so as to be alike. In the case of a lesser tooth depth, the tooth base of the corner teeth, in particular, is strengthened, and can therefore withstand greater loads.

Advantageously, the tooth depth of the corner teeth is designed, as compared with the tooth depths of adjacent teeth, in such a way that the overall cutting performance of the toothing is not substantially affected.

A design can then be reached wherein the tooth depth between the individual teeth is reduced continuously from the middle region in the direction of the end regions.

This measure makes it possible to ensure a particularly uniform characteristic of the load level of the teeth of the toothing.

According to an expedient design of the invention, the toothing portion has a variable tooth pitch, the tooth pitch being configured so as to be less in the end regions than in the middle region.

A strengthening of the end regions can thereby be achieved, with a substantially identical tooth contour, through simple variation of the pitch, i.e. of the distance from tooth tip to tooth tip. This is effected in that teeth in the end regions "move up" closer to one another, such that lesser tooth spaces and filling of the tooth bases ensue as a result in the case of the corner teeth.

In this case, the flanks of the corner teeth, also referred to as the tooth face and tooth back, can have the same slopes as adjacent teeth and have contours that are geometrically similar, but only slightly smaller, than the latter.

Further, in the case of this design, wherein, owing to the lesser tooth pitch, lesser tooth depths predominate in the end regions, but nevertheless because of the greater number of tooth tips comprised by the toothing, a high removal or cutting performance can be achieved, since more teeth now come into engagement.

The tooth pitch can be configured so as to be constant in the middle region and decrease abruptly towards the corner teeth. Alternatively, it is conceivable for the tooth pitch to be varied continuously in small steps along the toothing portion.

According to an alternative design of the invention, the toothing portion has a variable tooth pitch, the tooth pitch being realized so as to be greater in the end regions than in the middle region.

This measure, likewise, enables the strengthening of the corner teeth to be effected in a particularly simple and effective manner, since, because of the greater tooth pitch in the corner regions, more material can be provided between the corner teeth and adjacent teeth, to further improve the strength of the corner teeth.

It is to be noted in this connection that, frequently, a breakage of a corner tooth can occur in the region of its tooth base. Now, however, the corner teeth can be widened in precisely this region, such that they can withstand significantly greater loads.

An effective strengthening of the corner teeth can be achieved within the scope of this design, even if these corner teeth are to have the same tooth depths as adjacent teeth.

According to a further design of the invention, the corner teeth are provided with transition flanks, which have flatter regions than the flanks of adjacent teeth.

This measure has the advantage that a strengthening of the corner teeth can be effected irrespective of the choice of a variable or constant tooth pitch, or tooth depth. The corner teeth in this case acquire a "more blunt" contour, the corner teeth being yet better able to endure high loads because of their more solid design.

It is to be noted in this case that, even in the case of a "blunt" contour of the corner teeth, their tooth tips can nevertheless be designed so as to be sufficiently pointed, or sharp, such that the cutting performance of the corner teeth is not substantially affected. Since the corner teeth are now configured so as to be more resistant to wear and breakage, an even greater cutting performance overall can be obtained over the service life of the tool.

According to a further aspect of the invention, the corner teeth have tooth tips that are configured so as to be broader than the tooth tips of adjacent teeth.

Consequently, the region of the tooth tips of the corner teeth can be strengthened, as a result of which the wear resistance and the operating life of the tool can be further increased.

Further, because of this measure, excessive catching or hooking of the tooth tips of the corner teeth in the tool can be prevented, such that the risk of a breakage of the tooth tips, or of forces being introduced that can damage the corner teeth in the region of the tooth bases, can be significantly reduced.

In an expedient development of the invention, the toothing is provided with rounded tooth gullets, the tooth gullets in the end regions preferably having greater radii than the tooth gullets in the middle region.

The fact that the tooth gullets have roundings enables a favourable stress distribution to be achieved in the toothing portion. The stress level in the region of the tooth gullets can be reduced, and notch effects in the transition between two teeth, in particular stress concentrations caused by these notch effects, can be prevented.

It is particularly preferred in this case for the radii in the tooth gullets of the end regions to be configured so as to be greater than in the tooth gullets of the middle regions, such that a further strengthening of the corner teeth can be achieved to further reduce wear and increase the operating life.

In a preferred development of the invention, the toothing has a set.

As a result of this measure, on the one hand, a risk of the tool becoming jammed in the kerf can be reduced and, on the other hand, the chip removal and the cooling in the cut can be improved. The tool wear can also be further minimized as a result.

The set can be effected in the case of immediately succeeding teeth, in that in each case one tooth is set in one direction and the tooth succeeding it is set in the other direction. Alternatively, the set can also be effected with teeth being omitted, such that these teeth substantially have a straight extent in the direction of advance. Thus, for instance, every second or third tooth can be set. Finally, the set can also extend in a wave form along the toothing portion, the course of a half-wave in each case being indicated by the tips of a plurality of succeeding teeth.

According to a further aspect of the invention, a cranked portion is provided between the receiver and the toothing portion.

The cranked portion enables an offset to be realized between the receiver and the toothing portion. The offset constitutes an axial displacement of the toothing portion from the receiver in the direction of the longitudinal axis.

This allows flush working with the tool, even when the receiver of the tool is held axially from both sides at the tool spindle of the hand tool.

Applications in which the tool has to be guided along a wall, parallel to the latter, are thus made possible. Projections such as, for example, pipes or ducts can then be cut off flush with walls.

According to a further design of the invention, the receiver has a positive-closure element for receiving on the tool spindle in a positive-closure manner.

In this way, when the tool is driven, the power transmission can be effected over a large area by means of the tool spindle that can be driven in oscillation about its longitudinal axis, and can be effected in a highly reliable manner, such that high moments and large outputs can be transmitted.

Preferably in this case, the receiver has a profile in the form of a toothing, and the tool spindle has a counter-toothing that corresponds thereto, such that a high number of effective areas are available.

Slipping of the tool on the tool spindle, and associated excessive wear, can be prevented in an effective manner with a positive-closure receiver.

Preferably, the positive-closure receiver of the tool can be combined with non-positive closure elements, the non-positive closure serving substantially merely to secure the positive closure.

In an expedient development of the invention, the carrier blade is composed of a plurality of metal components.

The advantages of differing metals or metal alloys can thereby be combined, for instance in that one component is configured so as to be specially hardened and another component is configured so as to be specially tough.

Particularly preferred in this case is a combination of a high-speed steel, an HSS steel, which can have a high degree of hardness, and a high-carbon steel, an HCS steel, which can have a particular toughness.

It is understood that, alternatively or additionally, the metal component or metal components used can undergo a local treatment in order to increase yet further the wear resistance and the breakage resistance of the tool, particularly of the toothing.

In this case, a surface hardening is applied in the region of the teeth, especially the tooth flanks engaging directly in the workpiece, while measures to increase the toughness are preferred in the region of the tooth bases, so that breakages in this region can be prevented.

According to a further design of the invention, the toothing has a coating for the purpose of increasing strength and/or minimizing wear.

This measure enables the operating life of the tool to be increased yet more effectively.

A coating is appropriate, advantageously, particularly if, during the parting operation, the abrading of the workpiece is effected partially or exclusively through grinding operations between the tool and the workpiece.

Even in the case of a pure sawing tool, a coating that increases strength and/or minimizes wear can be applied advantageously.

The coating in this case can be effected with hard metal, for example a tungsten carbide based metal, with technical ceramic materials, for instance aluminium oxide based materials, or with diamond materials. Suitable combinations, in particular also with base or mediator materials, are conceivable.

In this way, the tool can also be used for parting metal materials, without the risk of excessive wear.

According to a further aspect of the invention, the toothing is realized in the toothing portion so as to be substantially straight or arcuate.

The tool is thus particularly adaptable to differing applications.

A tool realized with a straight toothing can also be used to realize flush cuts in the direction of advance, without the need for a substantial tool run-out.

A tool realized with an arcuate tooling can be operated particularly well in corner regions.

It is to be noted that the toothing can also be configured as a combination of straight and/or arcuate portions, which are brought together in an angled or tangential manner if appropriate.

In this way, a virtually straight cutting course, perpendicular to the direction of advance, can be achieved in spite of, for instance, the oscillations that occur, even if only in the case of small sweep angles, i.e. the constant to and fro motion of the tool, upon insertion into a workpiece. In other words, in the case of a to and fro motion of the tool, each tooth tip of the teeth of the toothing, in spite of the swiveling motion of the tool, can occupy a point on a notional straight line that describes the maximum insertion of the tool in the workpiece.

In combination with a hand tool having a housing, having a tool spindle that can be driven in rotary oscillation about its longitudinal axis and has a fastening for receiving a tool, the parting tool according to the invention can be applied in a multiplicity of ways. Substantial advantages are especially conspicuous in this case, in particular the high degree of protection against wear and the significantly reduced susceptibility to breakage of the toothing.

It is understood that the above-mentioned features of the invention and those to be explained in the following can be applied, not only in the respectively specified combination, but also in other combinations or singly, without departure from the scope of the present invention.

BRIEF DESCRIPTION OF THE DRAWINGS

Further features and advantages of the invention are disclosed by the following description of a plurality of preferred exemplary embodiments, with reference to the drawings, wherein:

FIG. 5 shows a side view of the parting tool according to FIG. 4a;

FIG. 6 shows an enlarged portion of a parting tool according to the invention that has been modified in comparison with FIG. 4b;

DESCRIPTION OF PREFERRED EMBODIMENTS

Figures 1, 2A, 2B, 3A, 3B:
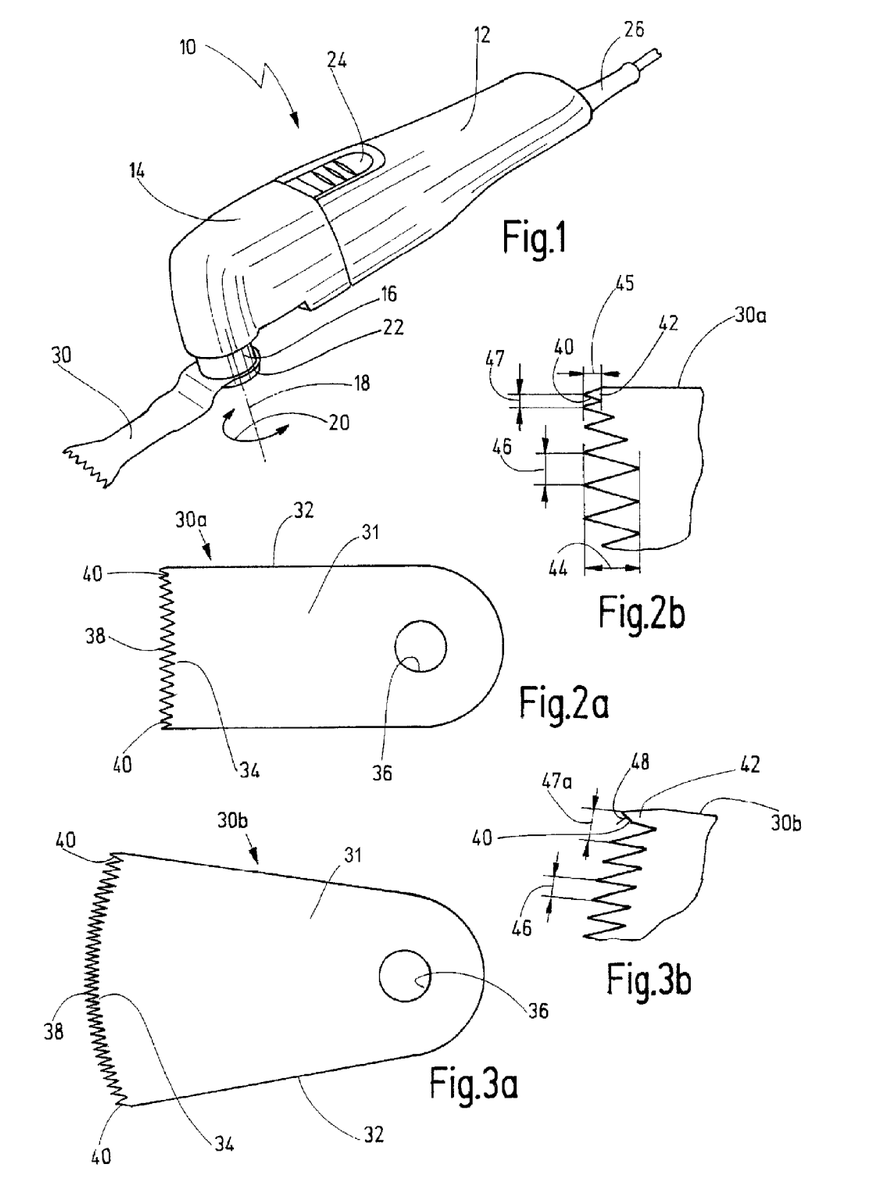
FIG. 1 shows a perspective representation of a hand tool comprising a parting tool according to the invention.
FIGS. 2a, 2b show a top view and an enlarged portion of a first parting tool according to the invention.
FIGS. 3a, 3b show a top view and an enlarged portion of a further parting tool according to the invention.

A hand tool having an oscillation drive is represented and denoted in its entirety by 10 in FIG. 1.

The hand tool 10 has a housing 12, and has a transmission head 14 in its front region. Further, an oscillation drive (not represented) is provided, which is configured to drive a tool spindle 16 in rotary oscillation about a longitudinal axis 18, as indicated by an arrow denoted by 20, which tool spindle is disposed in the region of the transmission head 14.

A tool 30 is fixed to the tool spindle 16 and secured by means of a fastening 22.

For the purpose of energy supply, the hand tool 10 has a supply line 26 that can be connected to an electric supply network. It is known that such hand tools can also be operated by means of batteries, hydraulic drives or pneumatic drives.

An operator can grip the hand tool 10 in the region of the housing 12 and optionally activate or deactivate it via a switch 24.

Owing to their great many applications, hand tools having a rotary oscillation drive have become very widespread. They can be used in a multiplicity of ways for parting, sawing, cutting, grinding or polishing.

The oscillation drive in this case effects an alternating motion of the tool 30 about the tool spindle 16, which motion is effected, for instance, at a frequency of approximately 5,000 to 25,000 oscillations per minute and with a sweep angle of approximately 0.5° to 7°.

These parameters enable the tool 30 to be inserted almost rectilinearly into a workpiece to be worked. Thus, angular recesses and through-holes can be made in workpieces in a particularly simple manner, with little effort, by means of the hand tool 10. A further preferred application is the flush parting-off of ducts, battens or the like at floors, ceilings or walls. Such applications can only be covered to a limited extent by other tools, or cannot be covered at all.

Particularly in the case of a parting tool, where the tool 30 is inserted fully into the workpiece, the entire toothing is engaged. It has been identified that, in the case of such applications, increased wear can occur at the toothing, especially in the case of corner teeth in the edge regions of the tool 30.

In the case of tools known in the prior art, the toothing is usually realized uniformly along a toothing portion. In end regions, in particular, corner teeth are frequently not realized in full, frequently being cut off outwardly in the region of their tooth tips and consequently being designed only as half-teeth.

A special tooth geometry, in particular of the corner teeth, is proposed within the scope of the present invention, in order to create a powerful, wear-resistant tool that is not susceptible to breakage and that is highly suitable for the said areas of application.

A first design of a tool according to the invention is represented and denoted by 30a in FIGS. 2a, 2b.

The tool 30a has a carrier blade 32, at one end of which a toothing portion 34 is provided. Disposed at the end of the carrier blade 32 that faces away from the toothing portion 34 is a receiver or support opening 36 for fixing to the tool spindle 16 of the hand tool 10. The carrier blade 32 extends flatly from the toothing portion 34 in the direction of the receiver, and in this case has parallel or slightly tapering sides.

The toothing portion 34 comprises the toothing, and is divided into a middle region 38 and end regions 40 that adjoin the latter.

FIG. 2b shows an enlarged representation of the end region 40. In this case, a corner tooth 42 is provided, which, in comparison with adjacent teeth, is strengthened in the region of the tooth gullet. In the present case, the strengthening is realized by a tooth depth 45 that is less than the tooth depth 44 of an adjacent tooth, and by the tooth pitch 47, which is less than the tooth pitch 46 of an adjacent tooth.

It is to be noted that each of these features results, independently of one another, in a strengthening of the corner tooth 42.

It can further be seen from FIG. 2b that the tooth depth decreases from the middle region 38, via a plurality of stages, towards the end regions 40. Alternatively, it is conceivable for the tooth depth to be configured so as to be constant almost along the entire toothing portion 34, and to reduce only immediately at the corner teeth 42.

A high cutting performance can be ensured by means of the design shown in FIG. 2b, in spite of the strengthening of the corner tooth 42. It is to be assumed that certain teeth that, unlike other teeth, have a reduced tooth depth cannot effect the same stock removal, or the same chip volume. Since, in the present case, however, the tooth pitch has been reduced in the end region 40, in addition to the reduction of the tooth depth, more teeth come into engagement per region of length in contrast to the middle region 38, such that a high cutting performance is still rendered possible.

It is to be noted that the representation of the tooth flanks shown is merely schematic in nature and that, to aid representation and comprehension, the indication of an actual tooth profile image and a more detailed illustration of the tooth back and tooth face have not been included. It is understood, of course, that usual tooth forms, profiles and other characteristics of a toothing can be used for parting, in particular for sawing.

Further, a coating consisting, e.g., of a technical ceramic material, may be applied to the surface of the tool 30a on both sides, the coating being denoted in FIG. 2a with reference numeral 31. Since the coating 31 is applied merely on top of the tool 30a with a small thickness, it will not change the total shape of the tool 30a. The coating 31 inhibits wear or increases strength. Alternatively, zones having particular heat treatments may be applied to the tool 30a. It is understood that the coating 31 can be used to improve the cutting behavior and the operating life of the tool 30a.

A further tool 30b according to the invention is represented in FIG. 3a. The tool 30b has a toothing portion 34 that is realized as an arc. A carrier blade 32 tapers significantly in the direction of a receiver 36.

It can be seen again from FIG. 3b that a corner tooth 42, which is disposed in an end region 40, has been strengthened in comparison with adjacent teeth. Unlike the design of the tool 30a according to FIG. 2b, the strengthening of the corner tooth 42 is realized here by a transition flank 48, which has a flatter course than the flanks of adjacent teeth.

Further, the end region 40 has a pitch 47a that is greater than a pitch 46 of adjacent teeth. As a result of this measure, sufficient free space has been created, such that, in spite of the flattened transition 48, the corner tooth 42 can have a tooth depth that is comparable to that of adjacent teeth. Likewise in this case, in spite of the increased resistance to wear and breakage, a high cutting performance can still be obtained.

Figure 4A:
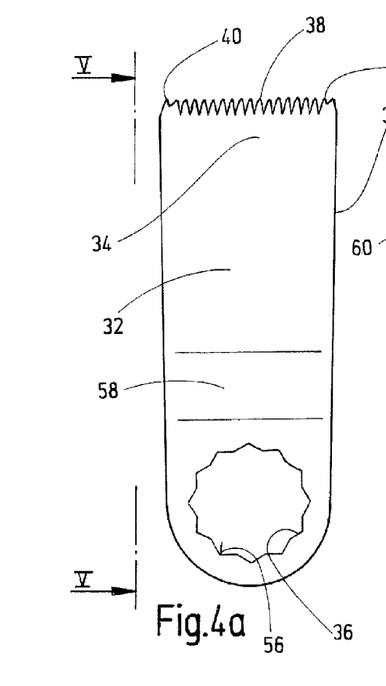
FIGS. 4a, 4b show a top view and an enlarged portion of yet a further parting tool according to the invention.

A further design of a tool 30c according to the invention is explained with reference to FIGS. 4a, 4b.

As already mentioned above, it is possible to combine round and substantially straight portions, in order to achieve a particularly advantageous cutting behaviour. Thus, the toothing can have a plurality of straight portions, which include an obtuse angle.

Figure 4B:
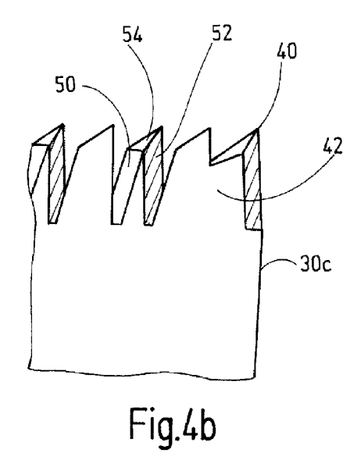

FIG. 4b, in contrast to FIGS. 2b, 3b, shows a more detailed representation of a toothing portion 34. The toothing in this case is realized as so-called Japan toothing. The latter is constituted by a particular tooth form and by a particular profile, embodied by the surfaces 50, 52, 54. As a result, and owing to a high hardness, the toothing is suitable for a multiplicity of applications and materials.

The strengthening of corner teeth 42 in end regions 40 is effected in this case by a reduced tooth depth, the tooth pitch being substantially constant along the toothing portion 34. FIG. 4a additionally shows a preferred design for the receiving of the tool 30c. For this purpose, an opening 36 has a positive-closure element 56, which is realized as a multi-tooth contour. If a corresponding counter-contour is provided on the tool spindle 16 on the hand tool 10, a particularly secure connection is obtained, which can transmit a high moment.

Figures 5, 6:
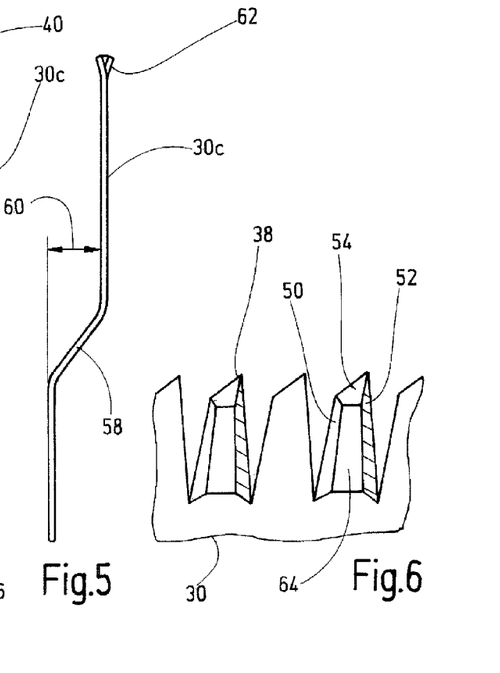

A side view of the tool 30c is represented in FIG. 5. A cranked portion, described by an arrow denoted by 60, is indicated in this case. This cranked portion is realized by a doubly angled transition 58 in the carrier blade 32. The cranked portion 60 enables the tool 30c to be used for flush working, even if, in the case of the tool 30c being fastened to the tool spindle 16 of the hand tool 10, the fastening 22 necessarily projects in the region of a receiver 36, as can be seen from FIG. 1.

Additionally indicated is a set 62, the intended purpose of which is to realize a kerf somewhat broader than a carrier blade 32, in order to prevent binding of the tool 30c and to aid the removal of chips and of heat produced during the cutting operation. In the present case, the set 62 is represented in a simplified, exaggerated manner.

A toothing form of a Japan toothing, which has been modified in comparison with FIG. 4b, is shown in FIG. 6. In this case, a separate flank 64 is provided, as a result of which a flank 54 is trapezoidal in form.

A particular suitability for special requirements can be achieved with the tooth form shown in FIG. 6. It is understood that a strengthening of corner teeth in end regions can be effected, in a manner analogous to the measures explained with reference to FIGS. 2b, 3b and 4b.

FIGS. 7a, 8a, 9a and 10a represent further designs of tools 30d, 30e, 30f, 30g according to the invention. In these cases, respective end regions 40 are represented in enlarged form in FIGS. 7b, 8b, 9b and 10b.

Figure 7A:
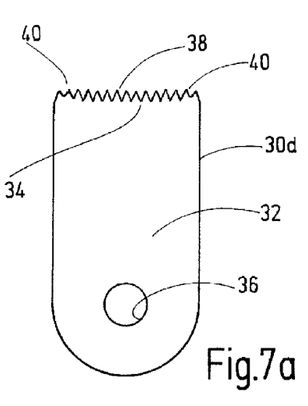
FIGS. 7a, 7b show a top view and an enlarged portion of a further parting tool according to the invention.
Figure 7B:
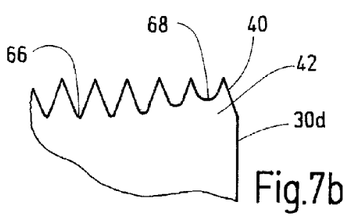
Figure 8A:
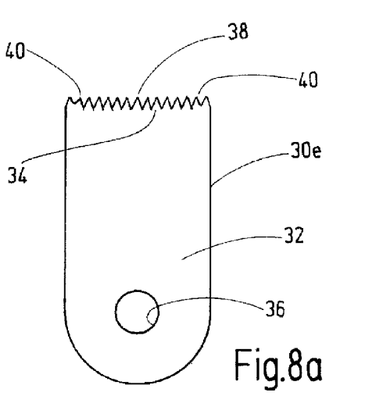
FIGS. 8a, 8b show a top view and an enlarged portion of a further parting tool according to the invention.
Figure 8B:
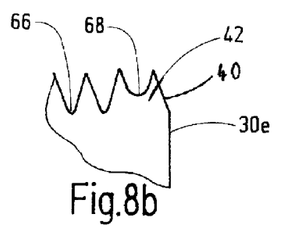

In FIGS. 7b, 8b, a strengthening of corner teeth 42 is indicated by a rounding of tooth gullets 68 of the corner teeth 42. In these cases, the rounding of the tooth gullets 68 is realized so as to be greater than a rounding of tooth gullets 66 of adjacent teeth. Here again, a reduced tooth depth is obtained in the case of the corner teeth 42, in contrast to adjacent teeth.

It is to be noted that a rounding of the tooth gullets 66, 68 constitutes an appropriate measure for effectively preventing breakages in the base region of teeth.

The design according to FIGS. 7a, 7b differs from that of FIGS. 8a, 8b in that, in the case of the former, there is a continuous enlargement of the rounding from the middle region 38 towards the end region 40, whereas, in the case of the latter, small roundings of tooth gullets 66 graduate abruptly into large roundings of tooth gullets 68 of corner teeth 42.

Figure 9A:
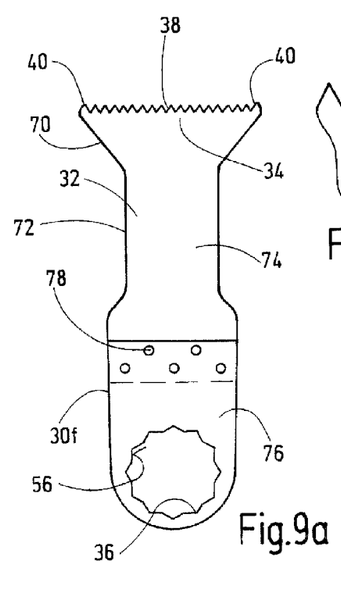
FIGS. 9a, 9b show a top view and an enlarged portion of a further parting tool according to the invention.

A tool 30f is represented in FIG. 9a, wherein the carrier blade has a significant diminution, or notched recess 72, which is led into by a bevel 70, starting from a toothing portion 34. A significantly narrower region is thus realized behind the toothing portion 34 on the carrier blade 32. Such a design is particularly suitable for removing chips, and results in a lesser amount of heat being produced.

In the present case, the carrier blade 32 is composed of a first component 74 and of a second component 76. The first component 74 and the second component 76 are joined by a joint 78, which can be configured as a riveted joint, welded joint or similar. A multi-component design of the carrier blade 32 enables differing material properties to be combined in an advantageous manner. Thus, for example, particularly hard materials, for instance for the toothing portion 34, can be combined with sufficiently tough, less hard materials, for instance for the region of the receiver 36.

Figures 9B, 10A, 10B:
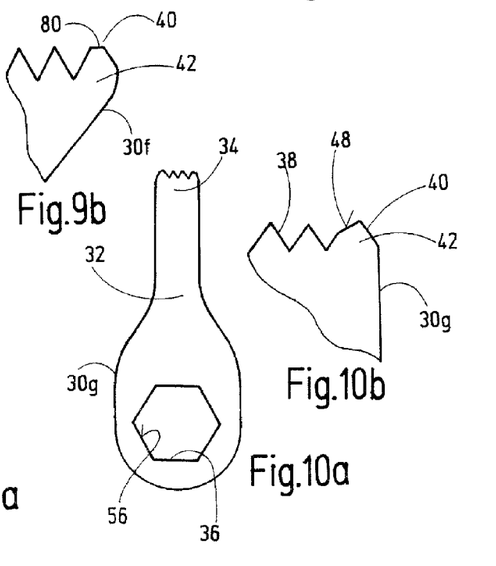
FIGS. 10a, 10b show a top view and an enlarged portion of a further parting tool according to the invention.

A corner tooth 42 of an end region 40 is represented in FIG. 9b, wherein a tooth tip 80 is realized so as to be substantially broader in comparison with adjacent teeth. This, likewise, constitutes an appropriate measure for strengthening the corner tooth 42.

Finally, a tool 30g is represented in FIGS. 10a, 10b, wherein the toothing portion 34 is configured so as to be particularly narrow. Consequently, it can be used to make particularly narrow grooves in workpieces, the depth of which grooves can be a multiple of the length.

In this case, exemplarily, the receiver 36 has a positive-closure element 56 in the form of a hexagon. Nevertheless, it is understood that other suitable positive-closure elements can be used to connect the tool 30g to the tool spindle 16 of the hand tool 10.

The relatively narrow design of the toothing portion 34 results in a relatively small number of teeth. To that extent, corner teeth 42 in end regions 40 of the toothing are particularly subject to loading, and can be susceptible to breakages.

In order to strengthen the corner tooth 42 in FIG. 10b, a transition flank 48 is again realized, which is configured so as to be substantially flatter than the flanks of teeth opposite. As a result, the corner tooth 42 is widened significantly in the region of its tooth root, and is less susceptible to breakage.

There has been created within the scope of the invention an improved tool for parting, in particular for sawing, which fulfils the particular requirements and applications of hand tools operated in rotary oscillation, and which can also offer a high resistance to wear and security in respect of breakages of the corner teeth in the case of plunge cuts and comparable applications in which the corner teeth of the toothing are particularly jeopardized.

What is claimed is:

1. A parting tool, comprising:
   a carrier blade having a receiver for fixing to a tool spindle of a power tool that is configured for being driven oscillatingly about a longitudinal axis of said tool spindle, said carrier blade further having a toothing portion carrying a finite, geometrically determined toothing, wherein said toothing is disposed at a distance from said receiver at one end of said carrier blade and is configured to be advanced perpendicularly in relation to the longitudinal axis;
   wherein said toothing is configured in a non-uniform manner along the toothing portion, the toothing portion comprising a middle region and two end regions adjoining said middle region, each of said end regions comprising strengthened corner teeth, wherein said strengthening of said corner teeth is effected by at least one feature selected from the group consisting of a tooth depth, a tooth pitch, a transition flank, a tooth tip, a tooth gullet, said feature being different from a corresponding feature provided on said middle region so as to strengthen said corner teeth;
   said toothing is configured substantially straight;
   said toothing having tooth depth comprises rounded tooth gullets having radii being smaller in said middle region than in said end regions; and
   said corner teeth have a tooth depth being smaller than a tooth depth of adjacent teeth of the toothing; and
   said toothing portion further has a variable tooth pitch, said middle region having a larger tooth pitch than a tooth pitch of said end regions.

2. The tool of claim 1, wherein said toothing portion has a variable tooth pitch, said middle region having a larger tooth pitch than a tooth pitch of said end regions.

3. The tool according to claim 1, wherein said toothing portion has a variable tooth pitch, said middle region having a smaller tooth pitch than a tooth pitch of said end regions.

4. The tool according to claim 1, wherein said corner teeth are provided with transition flanks, said transition flanks being flatter than flanks provided on adjacent teeth.

5. The tool according to claim 1, wherein said corner teeth have tooth tips that are configured broader than tooth tips provided on adjacent teeth.

6. The tool according to claim 1, wherein said toothing has a set.

7. The tool according to claim 1, further comprising an offset between said receiver and said toothing portion.

8. The tool according to claim 7, wherein said receiver and said toothing portion both comprise flat parts extending in parallel but offset from each other.

9. The tool according to claim 1, wherein said receiver comprises a positive-closure element mated to said tool spindle so as to allow a form-fit connection thereto.

10. The tool according to claim 1, wherein said receiver is configured as a receiving opening configured for fitting onto said drive spindle.

11. The tool according to claim 1, wherein said carrier blade is composed of a plurality of metal components secured one to another.

12. The tool according to claim 1, wherein said toothing comprises a coating configured for at least increasing strength or minimizing wear.

13. The tool according to claim 1, wherein said toothing of said toothing portion is configured substantially arcuate.

14. A parting tool, comprising:
- a carrier blade having a receiver for fixing to a tool spindle of a power tool that is configured for being driven oscillatingly about a longitudinal axis of said tool spindle, said carrier blade further having a toothing portion carrying a finite, geometrically determined toothing, wherein said toothing is disposed at a distance from said receiver at one end of said carrier blade and is configured to be advanced perpendicularly in relation to the longitudinal axis;
- wherein said toothing is configured in a non-uniform manner along the toothing portion, the toothing portion comprising a middle region and two end regions adjoining said middle region, each of said end regions comprising strengthened corner teeth;
- said toothing is configured substantially straight;
- said toothing having tooth depth comprises rounded tooth gullets having radii being smaller in said middle region than in said end regions said corner teeth have a tooth depth being smaller than a tooth depth of adjacent teeth of the toothing; and
- said toothing portion further has a variable tooth pitch, said middle region having a larger tooth pitch than a tooth pitch of said end regions.

15. A power tool comprising a housing, having a tool spindle that can be driven in rotary oscillation about a longitudinal axis thereof and has a fastening for receiving a parting tool, said parting tool comprising:
- a carrier blade having a receiver for fixing to said tool spindle, said carrier blade further having a toothing portion carrying a finite, geometrically determined toothing, wherein said toothing is disposed at a distance from said receiver at one end of said carrier blade and is configured to be advanced perpendicularly in relation to the longitudinal axis;
- wherein said toothing is configured in a non-uniform manner along the toothing portion, the toothing portion comprising a middle region and two end regions adjoining said middle region, each of said end regions comprising strengthened corner teeth;
- said toothing is configured substantially straight;
- said toothing having tooth depth comprises rounded tooth gullets having radii being smaller in said middle region than in said end regions said corner teeth have a tooth depth being smaller than a tooth depth of adjacent teeth of the toothing; and
- said toothing portion further has a variable tooth pitch, said middle region having a larger tooth pitch than a tooth pitch of said end regions.

* * * * *